US008322500B2

(12) United States Patent
Obrecht

(10) Patent No.: US 8,322,500 B2
(45) Date of Patent: Dec. 4, 2012

(54) SHOCK ABSORBER HOUSING

(75) Inventor: Johannes Obrecht, Oberkirch (DE)

(73) Assignee: Progress-Werk Oberkirch AG, Oberkirch (DE)

( * ) Notice: Subject to any disclaimer, the term of this patent is extended or adjusted under 35 U.S.C. 154(b) by 359 days.

(21) Appl. No.: 12/707,917

(22) Filed: Feb. 18, 2010

(65) Prior Publication Data
US 2010/0206676 A1    Aug. 19, 2010

(30) Foreign Application Priority Data

Feb. 19, 2009   (DE) .......................... 10 2009 010 984

(51) Int. Cl.
*F16F 9/32* (2006.01)
*F16F 9/54* (2006.01)
(52) U.S. Cl. ................ 188/322.19; 188/266.6; 188/281; 188/322.17; 188/322.21; 188/322.22; 29/525.14; 29/505; 254/2 B; 254/93 R; 254/418; 267/34; 267/64.15; 267/195; 267/221; 267/260; 267/286; 280/492; 280/779
(58) Field of Classification Search ............. 188/322.19, 188/322.17, 322.16, 322.18, 322.22; 267/260, 267/117, 119, 64.15, 34; 280/779, 492; 29/525.14, 29/505; 269/254 CS; 254/418, 93 R, 2 B
See application file for complete search history.

(56) References Cited

U.S. PATENT DOCUMENTS

| 3,892,397 | A | * | 7/1975 | Nicholls ........................ 267/195 |
| 4,372,545 | A | * | 2/1983 | Federspiel ..................... 267/221 |
| 4,441,593 | A | * | 4/1984 | Axthammer ............. 188/322.19 |
| 5,588,510 | A | * | 12/1996 | Wilke ........................ 188/266.6 |

OTHER PUBLICATIONS

"Tailored Orbitals—Einsatzmoeglichkeiten and Perspektiven"; ATZ-vol. 109; Oct. 2007; pp. 982-985.
Dr. Klaus Zimmermann; ThussenKrupp Steel Fachpresse Forum 2006—Tailored Orbitals; 2006; 30 pages.

* cited by examiner

*Primary Examiner* — Robert A Siconolfi
*Assistant Examiner* — San Aung
(74) *Attorney, Agent, or Firm* — Harness, Dickey & Pierce, P.L.C.

(57) ABSTRACT

A shock absorber housing for a shock absorber of a vehicle comprises a tube, which has a tubular wall, and an attaching element joined onto the tubular wall, the attaching element determining a critical force introduction area of an introduction of a force into the tubular wall, the tube in a longitudinal direction being built up from a first tube section having a first tubular wall and at least a second tube section having a second tubular wall, the first tube section and the second tube section being joined together by their ends facing one another. The first tube section and the second tube section are joined together with a tubular wall overlap of the first and second tubular wall, which overlap extends in a longitudinal direction, the tubular wall overlap being situated in the critical force introduction area of the attaching element.

16 Claims, 7 Drawing Sheets

SHOCK ABSORBER HOUSING

CROSS-REFERENCE TO FOREIGN APPLICATION

The present application claims priority of German Patent Application No. 10 2009 010 984.6 filed on Feb. 19, 2009.

BACKGROUND OF THE INVENTION

The present invention generally relates to shock absorber housings for shock absorbers of a vehicle.

More specifically, the present invention relates to a shock absorber housing for a shock absorber of the type having a tube, which has a tubular wall, and an attaching element joined onto the tubular wall, the attaching element determining a critical force introduction area of a force transmission from the attaching element into the tubular wall.

In vehicles, shock absorbers serve for protection against impact shocks and vibrations due to uneven road surfaces and for damping these. In vehicle construction, shock absorbers are also referred to synonymously as vibration dampers.

The tube of the shock absorber housing serves to accommodate the damper components, such as piston, valves, piston rod etc.

At least one attaching element is usually provided on the outside of the tube. The attaching element can here be designed to fix the tube and hence the shock absorber to the vehicle structure, in particular to the wheel suspension or to the wheel of a vehicle.

The attaching element may also be designed, however, to support a plate, in particular a spring plate, on the shock absorber housing.

In both of the configurations of an attaching element described above forces, which are concentrated locally in a critical force introduction area, are transmitted to the tubular wall of the tube by said element during operation of the vehicle. Where the attaching element serves for fixing the tube to the vehicle structure, the critical force introduction area is situated in the area of the upper axial end of the connection between this attaching element and the tubular wall. If the attaching element serves to support a plate on the tubular wall of the shock absorber housing, the critical force introduction area is distributed annularly around the tubular wall. In both of the aforementioned cases the critical force introduction area, viewed over the length of the tube, extends only to a small partial length of the tubular wall. In the critical force introduction area of the tubular wall the tube is subjected to high bending forces, which can lead to buckling or tearing of the tube at this point.

In conventional shock absorber housings the tube as a whole is formed integrally or in one piece over the entire length of the tube. The wall thickness of this one-piece tube is in this case dimensioned so that the tubular wall in the critical force introduction area is strong enough to prevent buckling or tearing of the tubular wall in this area. For this purpose a considerable wall thickness of the tubular wall is necessary in this area. Since the tube overall is of one-piece construction, however, the tubes are formed with this comparatively large wall thickness over their entire length, or the attaching element(s) are made of more elaborate, in particular stronger, design for a more uniformly distributed introduction of the forces into the tubular wall. This has the disadvantage that the shock absorber housing has a high weight. In vehicle construction, however, weight-saving is a significant factor, not least also because of the desire to reduce the energy consumption through a lower weight.

A shock absorber housing is disclosed by the German company booklet "ThyssenKrupp Steel Fachpresse Forum 2006—Tailored Orbitals", 2006.

A further shock absorber housing is disclosed by the German press article "Tailored Orbitals—Einsatzmöglichkeiten and Perspektiven" in ATZ, Issue 10/2007, Volume 109, 2007.

In the aforementioned German company booklet and in the aforementioned German press article it is proposed to address this problem by building up the tube of a shock absorber housing from more than one tube section, the tube sections being joined together in the longitudinal direction of the tube. As is described there, building up the tube from a plurality of tube sections affords the advantage that the various tube sections may have different wall thicknesses, that is to say those tube sections which are subjected to greater forces in operation are manufactured with a larger wall thickness, and those tube sections which are only subjected to a lesser force are correspondingly manufactured with a smaller wall thickness. As is described in the aforementioned German press article, the tube of a shock absorber tube may be constructed from a total of three tube sections, the two end tube sections having a larger wall thickness and the middle tube section having only a reduced wall thickness compared to these. Besides the advantage of a weight-saving, this also saves on material costs, since these are reduced due to the tube in one section being designed with a smaller wall thickness.

In both of the aforementioned documents on the prior art the individual tube sections are butt-welded, that is to say they are placed end-to-end against one another and if necessary also pressed axially against one another prior to the butt-welding.

Despite the weight- and cost-saving in the case of the tubes of shock absorber housings disclosed in both of the documents cited above, these carry the disadvantage that at least some individual tube sections are provided, which still have a large wall thickness, for example that end tube section, which according to both of the aforementioned documents serves to receive the fork. Another disadvantage to these known tubes of shock absorber tubes is that the individual tube sections are welded with the rim faces of their ends against one another, with the result that in the area of these joints there is no increased resistance to forces introduced precisely at the joint.

SUMMARY OF THE INVENTION

The object of the invention, therefore, is to develop a shock absorber housing of the aforementioned type so that the tube of the shock absorber housing is even lighter in weight but nevertheless affords an even greater rigidity in the critical force introduction area between the attaching element and the tubular wall of the tube.

According to the invention, a shock absorber housing for a shock absorber of a vehicle is provided, comprising a tube having a longitudinal axis and having a tubular wall; an attaching element joined onto the tubular wall the attaching element determining a critical force introduction area of a force transmission from the attaching element into the tubular wall; the tube comprising: a first tube section having a first tubular wall and having a first end, at least one second tube section having a second tubular wall and a second end, the first end of the first tube section and the second end of the at least one second tube section being joined together with a tubular wall overlap of the first tubular wall with the second tubular wall, the overlap extending in direction of the longitudinal axis, the tubular wall overlap being situated in the critical force introduction area of the force transmission from the attaching element into the tubular wall.

The shock absorber housing according to the invention therefore comprises a tube, which is built up from at least two tube sections. In contrast to the tube of the shock absorber housing disclosed by the prior art, the first and the at least one second tube section are not joined at the rim face, the first tube section and the second tube section instead being joined together with an overlap of their two tubular walls, this tubular wall overlap being situated in the critical force introduction area of the attaching element. In the tubular wall overlap area of the first tube section with the second tube section the wall thicknesses of the two tube sections are added to one another to form an overall wall thickness of the tube. This now has the advantage that not only the second tube section but also the first tube section can be produced with a smaller wall thickness, since in the tubular wall overlap area the material thicknesses of the two tubular walls are added together, so that this overall wall thickness is suited to absorbing the large forces introduced into the tubular wall via the critical force introduction area, in order to prevent bending, tearing or buckling of the tube. The attaching element itself may also be of less elaborate and hence cost-saving design. Since the critical force introduction area of the introduction of force from the attaching element to the tubular wall of the tube only extends over a limited partial length of the attaching element, it is therefore sufficient to provide an increased wall thickness of the tube solely in the critical force introduction area. According to the invention this increased wall thickness in the critical force introduction area is afforded by the tubular wall overlap, without it being necessary to form one of the two tube sections with a greater wall thickness throughout. Thus the first tube section and the second tube section may have tubular walls which have a reduced wall thickness over their entire length.

The advantages of the shock absorber housing according to the invention therefore lie in yet a further weight saving and material cost saving in conjunction with increased rigidity in the critical force introduction area.

It is to be understood that the shock absorber housing according to the invention may have two or more attaching elements and hence two or more critical force introduction areas distributed over the length of the shock absorber housing, the shock absorber housing according to the invention then preferably being built up from a corresponding number of tube sections, the adjoining sections of each of which are joined with a tubular wall overlap and this tubular wall overlap being situated in the respective critical force introduction area.

For the purposes of the invention the terms "first tube section" and "second tube section" are to be broadly interpreted. The first tube section is preferably an end tube section of the shock absorber housing, and this end tube section may be the top or bottom end tube section when the shock absorber is in the fitted position in a vehicle.

In a preferred refinement the first tube section is an end tube section and at its end facing away from the second tube section is closed by a base, and the first tube section is produced as a deep-drawn, part, on which the base is integrally formed with the first tubular wall.

This measure known in the art from the aforementioned German company booklet here has the advantage that the base usually provided at the one end is integrally formed with the first tube section, thereby further reducing the production costs of the first tube section, because the base does not have to be subsequently joined on.

In a further preferred refinement the first tubular wall of the first tube section and the second tubular wall of the second tube section have approximately the same wall thickness.

If the first tubular wall and the second tubular wall have the same wall thickness, both tube sections can be cut to length from a long length of tubing, thereby further reducing the production costs. If the first tubular wall and the second tubular wall have only approximately the same wall thickness, the first tube section has a slightly larger wall thickness than the second tube section, when the attaching element is affixed to the first tube section. As has already been stated above, however, it is not necessary to form the first tube section with a significantly increased wall thickness compared to the second tube section, for example one twice as thick.

In a further preferred refinement the second tube section has a constant outside diameter over its length and is inserted into the first tube section according to the tubular wall overlap.

In this refinement, therefore, the second tube section can advantageously be cut to length from a long length of tubing and without further forming operations can be joined to the first tube section by simply inserting the second tube section into the first tube section according to the tubular wall overlap.

In this case it is further preferred if the first tube section is expanded in the area of the tubular wall overlap, compared to the rest of its area.

It is advantageous here for the first tube section to have an increased inside and outside diameter solely in the tubular wall overlap area, whilst the second tube section, in order to save material, may have a smaller inside and outside diameter in the rest of its area. Expanding the first tube section in the area of the tubular wall overlap, in conjunction with the aforementioned measure of inserting the second tube section into the first tube section, moreover affords the advantage that the end of the expanded area of the first tube section facing away from the second tube section forms a bearing shoulder, thereby predefining the insertion depth of the second tube section into the first tube section. This facilitates handling when joining the two tube sections together.

As an alternative to the afore-mentioned refinement according to which the second tube section is inserted into the first tube section, it is provided in another preferred refinement that the first tube section is inserted into the second tube section according to the tubular wall overlap.

In a preferred refinement the attaching element is a mount for affixing the tube to a structure of the vehicle, in particular to a wheel suspension or a wheel of the vehicle.

It is further preferred here if the attaching element has a predetermined length in the longitudinal direction of the tube, if the attaching element is joined to the first tube section and if the first tube section has a length, which is approximately equal to the length of the attaching element.

The first tube section is therefore of a length optimally adapted to the attaching element. The attaching element here in particular extends up to the tubular wall overlap area, as provided in another preferred refinement.

As an alternative and in the context of one of the previously mentioned preferred refinements, according to which the first tube section is inserted into the second tube section according to the tubular wall overlap, it is provided that the end of the attaching element facing the second tube section forms a substantially flush joint with the end of the second tube section which faces the first tube section.

In the latter case, the tubular wall overlap is also situated in the force introduction area of the attaching element because the force introduction area extends from the end of the attaching element facing the second tube section away into the area of the tubular wall overlap. The advantage of this refinement is that the end of the attaching element which faces the second tube section can be solidly connected with the first tube section as well as with the end of the second tube section by bonding, for example by soldering, whereby the force introduction of the attaching element into the tube of the shock absorber housing can be improved further. Another advantage is that an undisturbed force flow from the attaching element into the second tube section is achieved by the front to front joint of the attaching element with the second tube section.

In a further preferred refinement the attaching element is a circumferential annular flange for supporting a plate, in particular a spring plate.

In this case the tubular wall overlap between the first tube section and the second tube section, viewed in the longitudinal direction of the tube, is situated approximately on a level with the annular flange for supporting the plate.

It is further preferred here if the end of the first tube section facing the second tube section is bent over to form the annular flange.

It is advantageous here for the tubular wall overlap between the second tube section and the first tube section to be provided with an additional functional element, which here in the form of the annular flange is advantageously integrally formed with the first tube section. This obviates the need for further components or further operations, for example subsequent expansion of the tube in order to produce this functional element.

In a further preferred refinement the tube is built up from the first tube section, the second tube section and at least a third tube section with a third tubular wall, the first tube section being joined to the second tube section by the tubular wall overlap of the first and second tubular wall and the second tube section being joined to the third tube section by the tubular wall overlap between the second and the third tubular wall.

In this refinement the tube of the shock absorber housing according to the invention is therefore built up from three tube sections, correspondingly with two joints at which the tube sections are joined together with a tubular wall overlap, so that the shock absorber housing is suited to the affixing of two attaching elements, the critical force introduction area of the respective attaching element being situated in the respective tubular wall overlap between the first tube section and the second tube section and between the second tube section and the third tube section.

In this context it is furthermore preferred if the second tube section is inserted into the third tube section according to the tubular wall overlap.

This measure is particularly advantageous where the second tube section has a constant outside diameter over its length, as is provided for in a refinement specified above, because again the second tube section does not have to be subjected to a forming operation for connecting the second tube section to the third tube section, but can be cut to an overall length from one tube of constant inside and outside diameter.

In preferred refinements the tubular wall overlap of the first tube section with the second tube section is approximately 5 mm to approximately 25 mm in the longitudinal direction of the tube.

In the interests of material savings, the selected tubular wall overlap of the first tube section with the second tube section is just large enough to satisfy the rigidity requirements in the force introduction area between the attaching element and the tubular wall of the tube.

In a further preferred refinement the second tube section is produced from a sheet blank as a longitudinal seam-welded tube section.

This is advantageous in that the production costs for producing the second tube section are reduced still further.

Further advantages and features are set forth in the following description and the drawing attached.

It will be understood that the features mentioned above and yet to be explained below can be used not only in the particular combination specified but also in other combinations or alone, without departing from the scope of the present invention.

BRIEF DESCRIPTION OF THE DRAWINGS

An exemplary embodiment of the invention is represented in the drawing and will be described in more detail below with reference to this drawing, in which.

DETAILED DESCRIPTION OF AN EXEMPLARY PREFERRED EMBODIMENT

Figure 1:
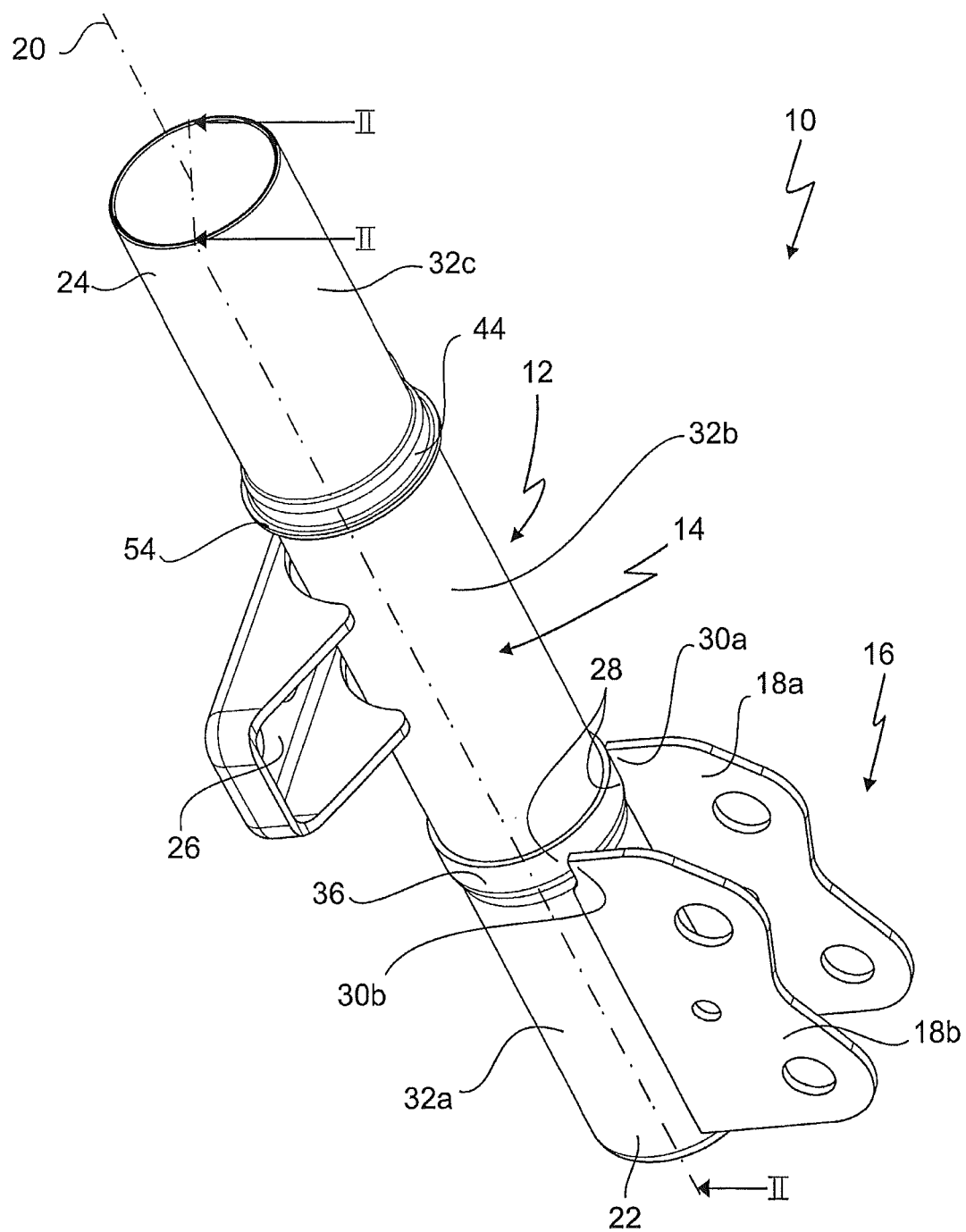
FIG. 1 shows a perspective view of a shock absorber housing of a shock absorber for a vehicle.
Figure 2:
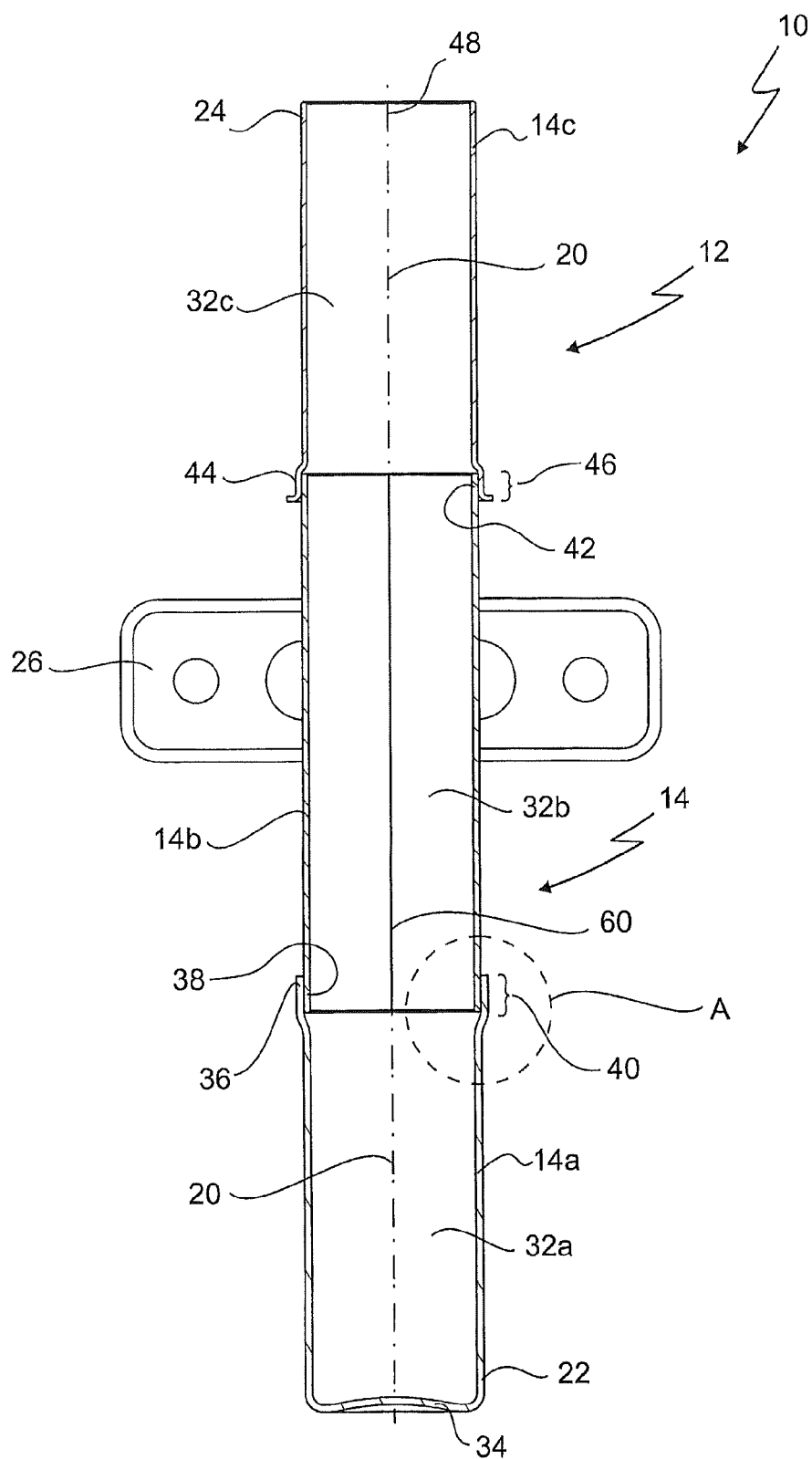
FIG. 2 shows a longitudinal section through the shock absorber housing in FIG. 1 along a plane of section II-II in FIG. 1.

FIGS. 1 and 2 represent a shock absorber housing of a vehicle shock absorber provided with the general reference numeral 10.

In addition to the shock absorber housing 10 the shock absorber comprises further components such as a piston, piston rod, valves, hydraulic devices and the like, which for the sake of clarity are not represented in the drawing.

The shock absorber housing 10 comprises a tube 12, having a tubular wall 14 with three tubular wall portions 14*a*, 14*b* and 14*c*.

A first attaching element 16 is joined onto the tube 12. The first attaching element 16 here comprises two plates 18*a*, 18*b*, which extend over a partial length of the tube 12 in the direction of a longitudinal axis 20 of the tube 12 and are affixed, for example welded, to the tubular wall 14. The attaching element 16 serves for fixing the tube 12 to a vehicle structure (not shown), the attaching element 16 more specifically being fixed to the wheel suspension of a wheel or to the wheel of a vehicle.

With the shock absorber 10 in a fitted position in a motor vehicle the tube 12 is oriented substantially vertically, a first end 22 of the tube 12 then forming the bottom end and a second end 24 of the tube 12 forming the upper end of the shock absorber housing 10.

On the tubular wall 14 a further attaching element 26, which serves as vehicle stabilizer mounting, is affixed to the tube 12.

The first attaching element 16, which is also referred to as a "bracket", defines a first critical force introduction area 28, which viewed in the longitudinal axis 20 is situated approximately on a level with the ends 30a, 30b of the plates 18a, 18b. In the fitted state in a vehicle the plates 18a and 18b, like the tube 12, extend approximately vertically and, owing to the—in respect of the longitudinal axis 20 of the tube 12—extra-axial fixing of the tube 12 to the vehicle structure by way of the plates 18a, 18b, large forces act in the critical force introduction area 28 of the tubular wall 14b, 14c, said forces also being directed, in particular, transversely to the longitudinal axis 20 of the tube 12 and possibly leading to buckling, tearing or fracture of the tubular wall 14 in the critical force introduction area 28, if the tubular wall 14 does not possess adequate rigidity or strength in this area. The critical force introduction area 28 is concentrated on a small, partial length of the tubular wall 14 in the direction of the longitudinal axis 20.

The tube 12 is here built up from a total of three tube sections, that is to say a tube section 32a, a tube section 32b and a tube section 32c.

The tubular wall portion 14a is the tubular wall of the tube section 32a, the tubular wall portion 14b is the tubular wall of the tube section 32b and the tubular wall portion 14c is the tubular wall of the tube section 32c.

At its end facing away from the tube section 32b the tube section 32a has a base 34, which seals the tube section 32a. The base 34 is here integrally formed with the tubular wall 14a by producing the entire tube section 32a as a canister-shaped deep-drawn part.

The tube section 32a has an open end 36 facing away from the base 34, and the tube section 32b has an end 38 facing the tube section 32a.

The tube section 32a and the tube section 32b are joined together by their ends 36 and 38 facing one another, the tube section 32a and the tube section 32b being arranged relative to one another with a tubular wall overlap of the tubular wall 14a of the tube section 32a with the tubular wall 14b of the tube section 32b which overlap extends in the longitudinal direction 20. The area of the tubular wall overlap 40 is shown enlarged in FIG. 3. The end 38 of the tubular wall 14b of the tube section 32b is here inserted into the open end 36 according to the tubular wall overlap 40. Whilst the tubular wall 14b of the tube section 32b including the end 38 is of cylindrical shape throughout, the tube section 32a, in the area of the tubular wall overlap 40, that is to say in the area of its end 36, is expanded compared to its remaining area, according to the outside diameter of the tubular wall 14b, as can be seen in particular from FIG. 3. Where the tube section 32a is produced as a deep-drawn component, the expansion of the tubular wall 14a in the area of the end 36 may be formed during the deep-drawing process.

Referring again to FIG. 1, the tubular wall overlap 40 is situated in the critical force introduction area 28 of the attaching element 16. In the critical force introduction area 28 the tubular wall overlap 40 leads to an overall wall thickness which represents the sum of the wall thickness of the tubular wall 14a and the wall thickness of the tubular wall 14b.

Outside the tubular wall overlap 40 the wall thickness of tubular wall 14 is defined solely by the wall thickness of tubular wall 14a and the wall thickness of tubular wall 14b. Owing to the greater overall wall thickness in the area of the tubular wall overlap 40, the wall thicknesses of tubular walls 14a and 14b can be considerably reduced compared to conventional shock absorber tubes. The wall thickness of tubular wall 14a, for example, is approximately 2 mm, and the wall thickness of tubular wall 14b is approximately 1.8 mm. In the area of the tubular wall overlap 40 the overall wall thickness of the tubular wall 14 in this example is approximately 3.8 mm, which represents an adequate wall thickness and resulting rigidity and strength of the tubular wall 14 for the large forces acting in the critical force introduction area 28. In addition the attaching element 16 is of less elaborate design owing to the large overall wall thickness.

In particular, the tubular wall 14a and the tubular wall 14b may have approximately the same small wall thickness, which is not possible in the shock absorber tubes disclosed by the prior art.

Figure 3:
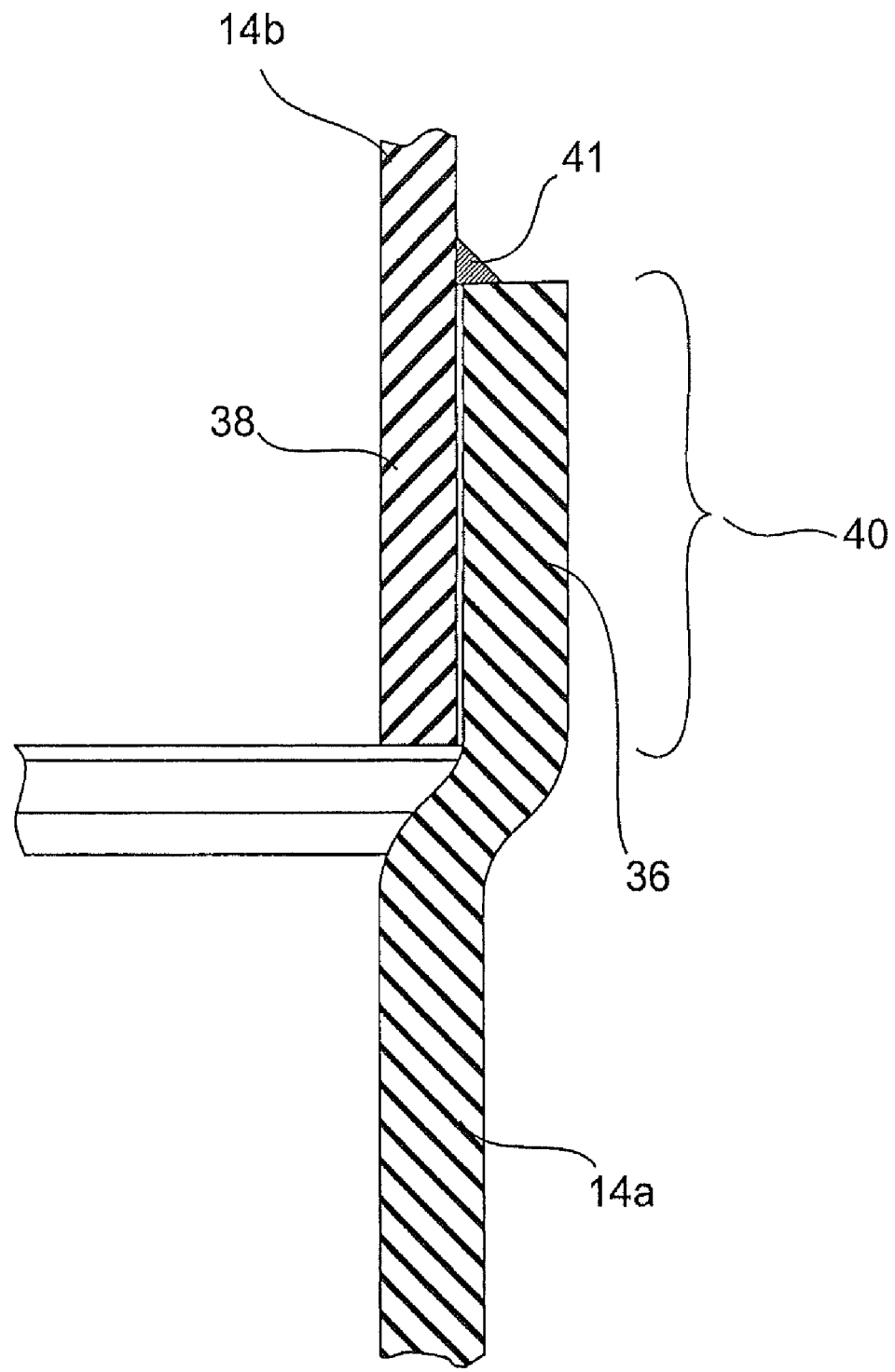
FIG. 3 shows an enlarged representation of the detail A in FIG. 2.

According to FIG. 3 the tube section 32a is permanently affixed to the tube section 32b by a weld seam 41 running around the longitudinal axis 20.

The tube section 32b is affixed to the tube section 32c in a similar way to that in which the tube section 32a is affixed to the tube section 32b. For this purpose an end 42 of the tube section 32b facing away from the end 38 is inserted into an end 44 of the tube section 32c facing this. Whilst the tube section 32b, as described above, has a constant outside diameter over its entire length, that is to say even at its end 42, the tube section 32c, i.e. the tubular wall 14c thereof, is expanded in the area of the end 44, the tube section 32b being inserted into the expanded end 44 according to the tubular wall overlap 46.

Situated remotely from its end 44, the tube section 32c has an open end 48, which in order to receive a damper bearing (not shown) is produced to very fine tolerances. Since the tube 12 is built up overall from multiple tube sections, it is not necessary in this case for the entire tube 12 to satisfy the high tolerance requirements, merely the tube section 32c.

The tubular wall overlap 46 between the tube section 32b and the tube section 32c is situated in a second critical force introduction area 53 of a further attaching element 50 and here fulfils a further function, which will be described below with reference to FIGS. 4 and 5.

Figure 4:
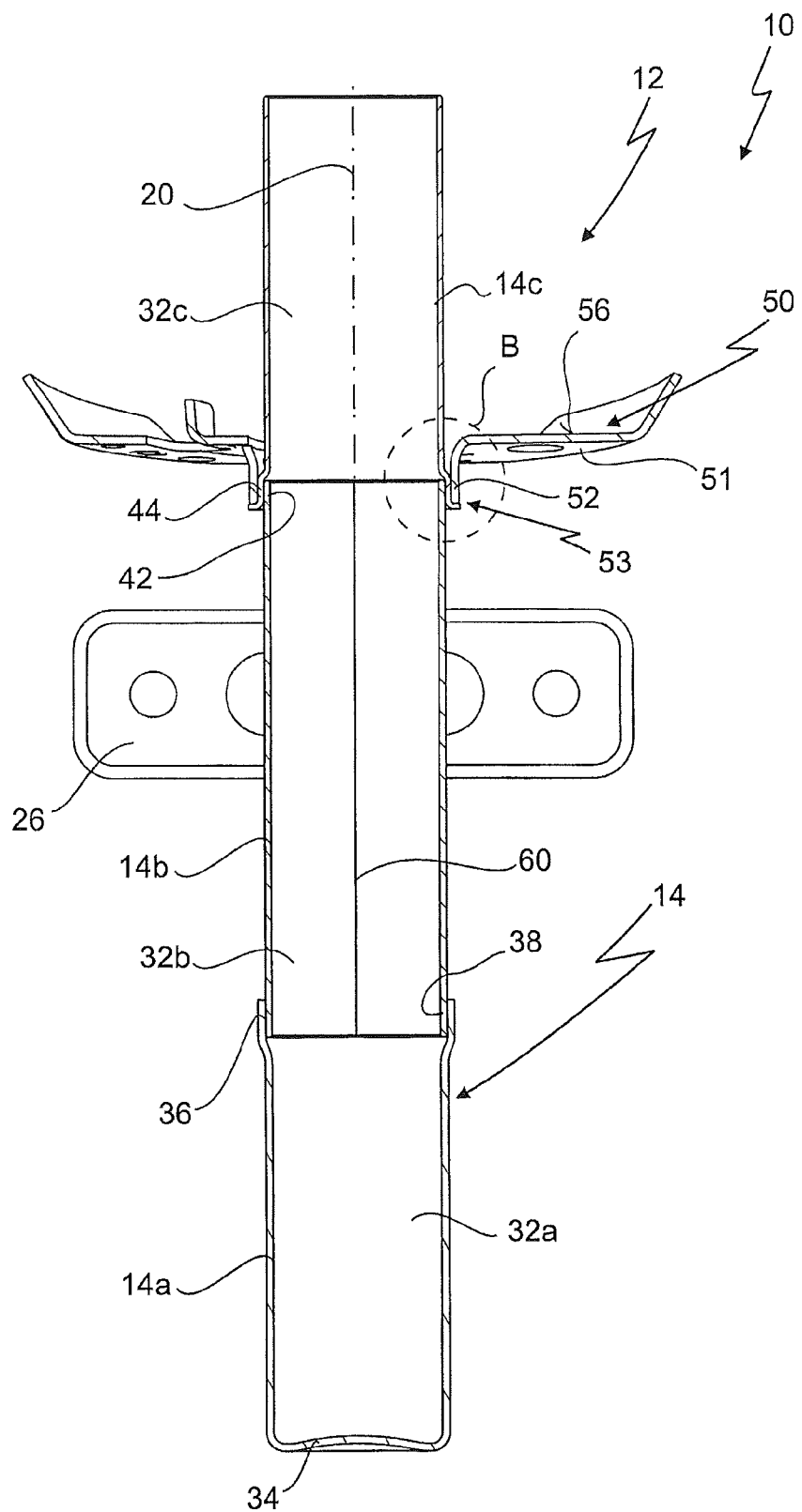
FIG. 4 shows the shock absorber housing in FIG. 2 with a further attachment part.

FIG. 4 shows the tube 12 with a plate fitted thereon as the further attaching element 50, which comprises an annular collar 52 extending around the longitudinal axis 20.

The end 44 of the tubular wall 14c of the tube section 32c is bent over radially outwards to form an annular flange 54, the annular flange 54 serving to support the plate 50. The plate 50 serves as spring plate for supporting a spring (steel spring or pneumatic spring), which is not shown and which rests on a side 56 of the plate 50 facing away from the annular collar 52. The critical force introduction area 53 here extends for an axially short length as an annular area around the tubular wall 14.

In accordance with the requirements for the rigidity of the connection between the tube section 32a and the tube section 32b, the length of the tubular wall overlap 40 between the tube section 32a and the tube section 32b lies in the range from approximately 5 mm to approximately 25 mm. In the exemplary embodiment shown the length of the tubular wall overlap 40 is approximately 10 mm.

The same applies to the length of the tubular wall overlap 46 between the tube section 32b and the tube section 32c, although the selected tubular wall overlap 46 can be shorter than the tubular wall overlap 40, owing to the lower rigidity requirements in the area of the critical force introduction area 53. The tubular wall overlap 46, for example, may have a length in the range from approximately 5 mm to approximately 25 mm, preferably in the range from approximately 5 mm to approximately 10 mm.

Referring again to FIG. 1, it is to be noted that the length of the tube section 32a in the direction of the longitudinal axis 20 is approximately equal to the length of the attaching element 16, or more precisely the length of the plates 18a, 18b. This allows the plates 18a, 18b to be affixed to the tube section 32a before joining the tube sections 32a, 32b, 32c together.

The tube section 32b can furthermore be produced from one sheet blank as a longitudinal seam-welded tube section, the longitudinal weld seam 60 being shown in FIG. 2 and in FIG. 4.

Figure 6:
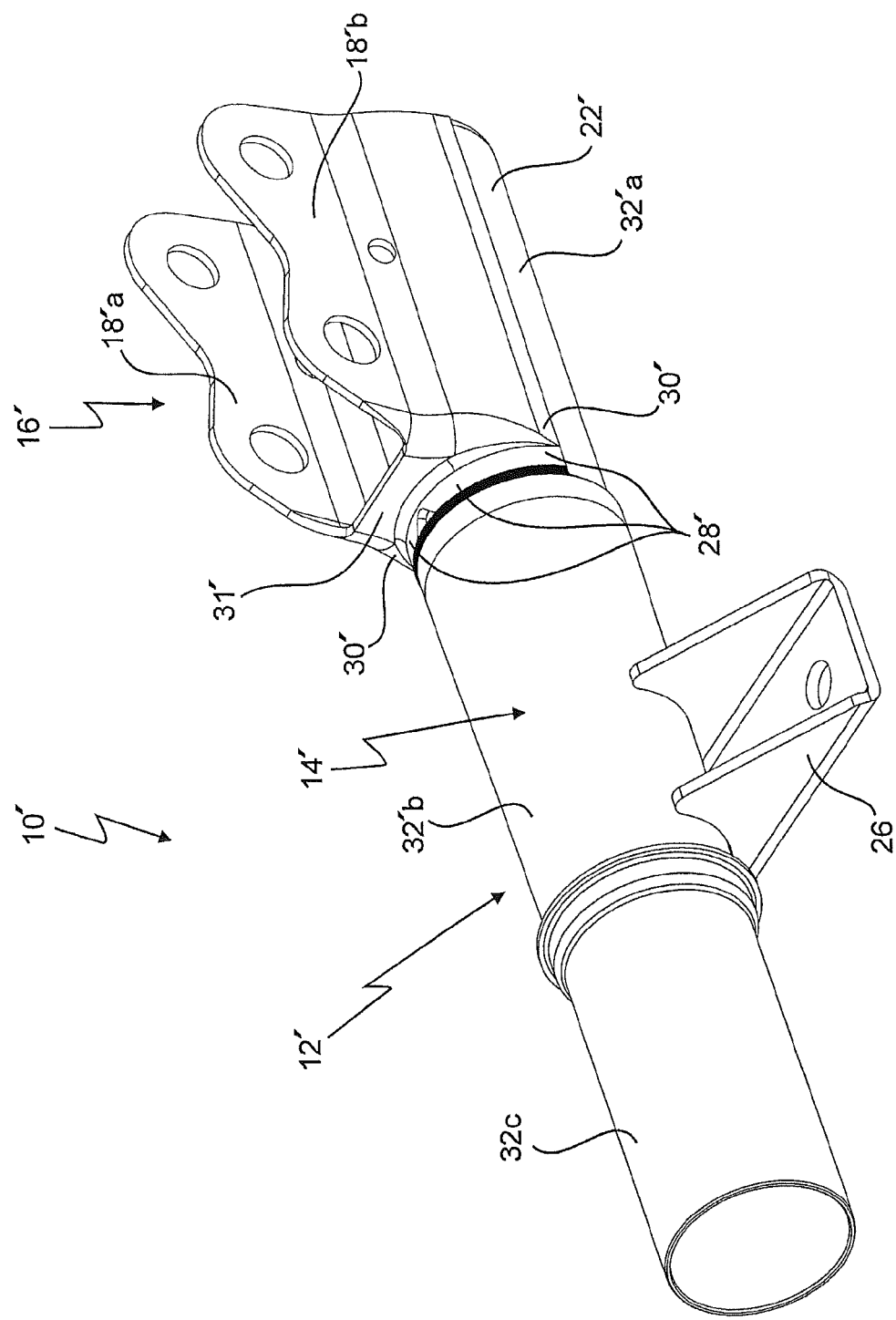
FIG. 6 shows a shock absorber housing of a shock absorber for a vehicle in a perspective view according to another embodiment, which is a modification of the embodiment in FIG. 1.
Figure 7:
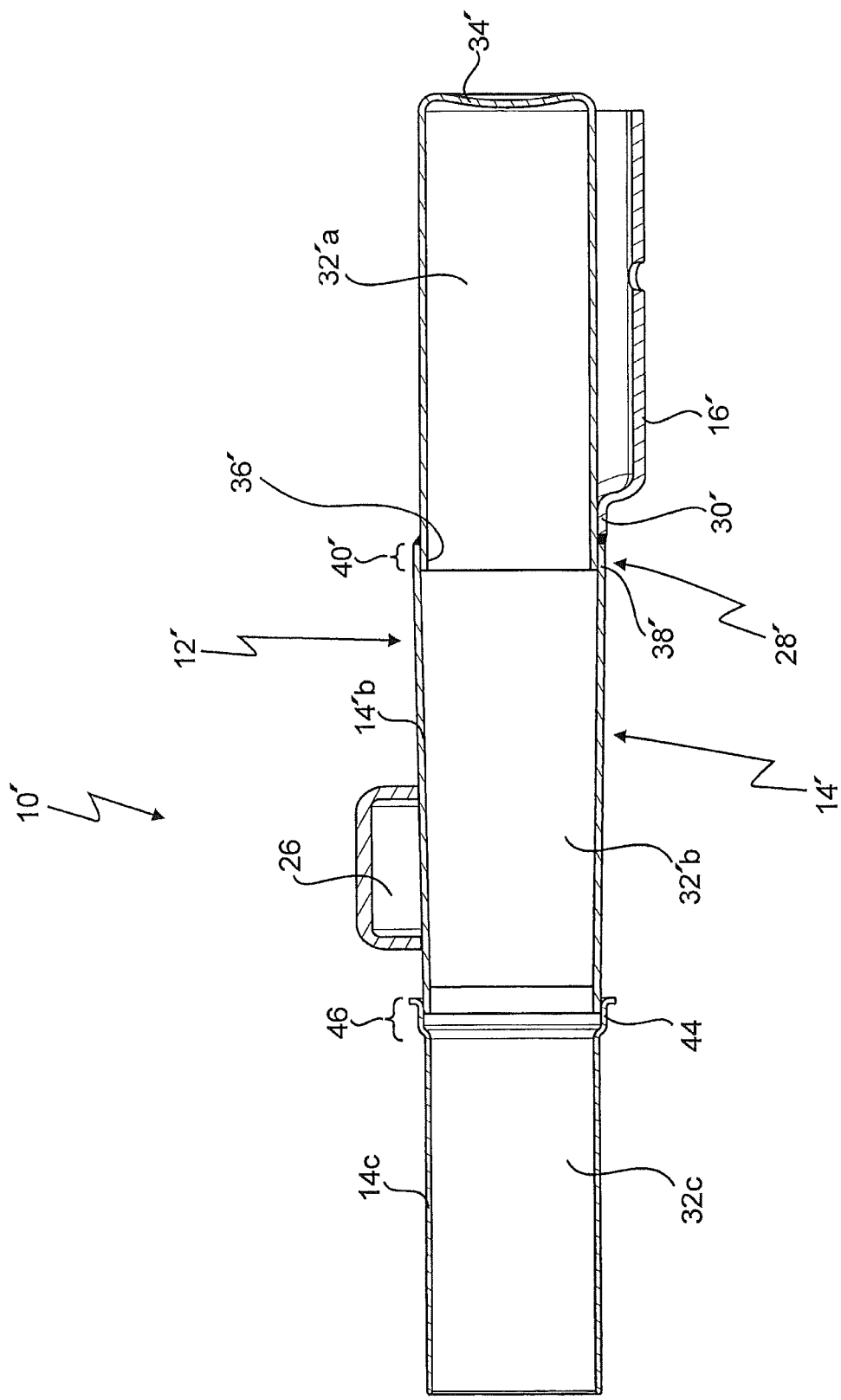
FIG. 7 shows a longitudinal section of the shock absorber housing in FIG. 6.

FIGS. 6 and 7 show another embodiment of a shock absorber housing 10' for a shock absorber of a vehicle. The shock absorber housing 10' represents a modification of the shock absorber housing 10 in FIGS. 1 and 2. Those parts of the shock absorber housing 10', which are unchanged with respect to corresponding parts of the shock absorber housing 10, are labeled with the same reference numerals like the parts of the shock absorber housing 10. Those parts of the shock absorber housing 10', which are similar or comparable with corresponding parts of the shock absorber housing 10, are provided with the same reference numerals like the parts of the shock absorber housing 10, followed by a '.

The tube 12' of the shock absorber housing 10' is built up from three tube sections 32'a, 32'b and 32c. In the following, only the differences between the shock absorber housing 10' with respect to the shock absorber housing 10 are described.

Differently from the shock absorber housing 10, the first tube section 32'a is inserted into the second tube section 32'b according to the tubular wall overlap 40' so that the end 36' of the first tube section 32'a is arranged within the end 38' of the second tube section 32'b. The end 36' of the first tube section 32'a is not expanded in the present embodiment.

The attaching element 16' is joined to the first tube section 32'a, wherein the end 30' of the attaching element 16' forms a flush joint with the end 38' of the second tube section 32'b. The end 30' of the attaching element 16' is preferably joined to the end 38' of the second tube section 32'b by substance bonding, for example, by soldering, and is also joined to the first tube section 32'a by, for example, soldering.

In this embodiment, the attaching element 16' thus does not extend into the tubular wall overlap 40', but ends immediately in front of the tubular wall overlap 40'. The force introduction area 28' of the attaching element 16' into the tubular wall 14' of the tube 12', however, is also situated in the tubular wall overlap 40', because the critical force introduction in the area of the end 30' of the attaching element 16' extends part of the way from the end 30' so that the tubular wall overlap 40' is situated in the critical force introduction area 28' of the attaching element 16' in this embodiment, too.

Figure 5:
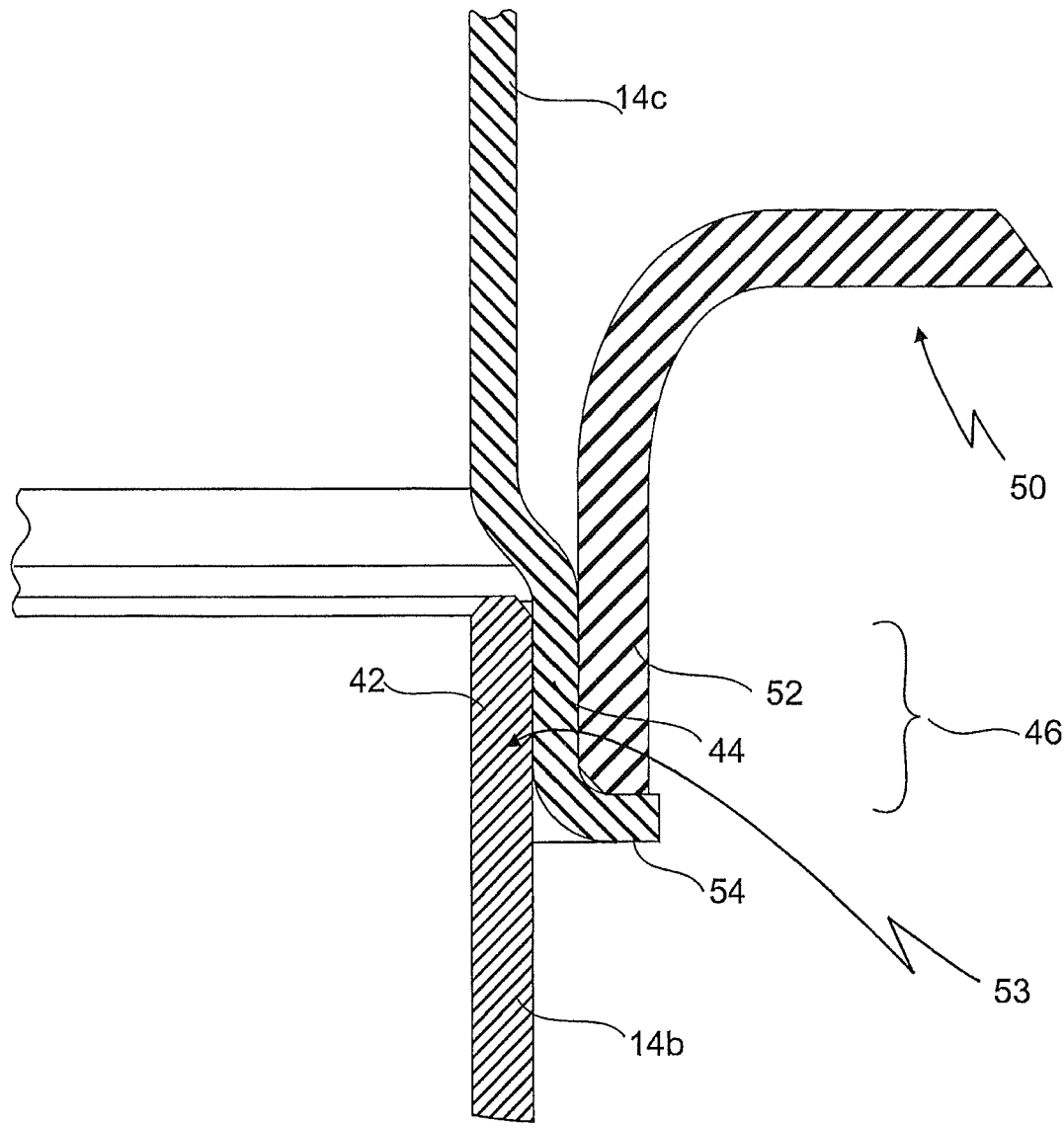
FIG. 5 shows an enlarged representation of the detail B in FIG. 4.

Since tube portion 32c in FIGS. 6-7 and its connection to the housing portion 32'b, is identical to the tube portion 32c in the embodiment shown in FIGS. 1-5 and its connection to the housing portion 32b, the provision of a spring plate 50 mounted at this tubular wall overlap connection 46, as illustrated in FIGS. 4-5, is equally applicable to the alternative embodiment shown in FIGS. 6-7.

What is claimed is:

1. A shock absorber housing for a shock absorber of a vehicle, comprising:
   a tube having a longitudinal axis and having a tubular wall, and
   an attaching element joined onto said tubular wall, said attaching element determining a critical force introduction area of a force transmission from said attaching element into said tubular wall;
   said tube comprising:
   a first tube section having a first tubular wall and having a first end, and
   at least one second tube section having a second tubular wall and a second end,
   said first end of said first tube section and said second end of said at least one second tube section being joined together with a tubular wall overlap of said first tubular wall with said second tubular wall, said overlap extending in the direction of said longitudinal axis,
   said tubular wall overlap being situated in said critical force introduction area of said force transmission from said attaching element into said tubular wall;
   wherein said first tube section is an end tube section having a third end facing away from said first end which is closed by a base, wherein said first tube section is produced as a deep-drawn part, on which said base is integrally formed with said first tubular wall.

2. A shock absorber housing for a shock absorber of a vehicle, comprising:
   a tube having a longitudinal axis and having a tubular wall, and
   an attaching element joined onto said tubular wall, said attaching element determining a critical force introduction area of a force transmission from said attaching element into said tubular wall;
   said tube comprising:
   a first tube section having a first tubular wall and having a first end, and
   at least one second tube section having a second tubular wall and a second end,
   said first end of said first tube section and said second end of said at least one second tube section being joined together with a tubular wall overlap of said first tubular wall with said second tubular wall, said overlap extending in the direction of said longitudinal axis,
   said tubular wall overlap being situated in said critical force introduction area of said force transmission from said attaching element into said tubular wall;
   wherein said first tubular wall of said first tube section and said second tubular wall of said at least one second tube section have approximately an equal wall thickness.

3. The shock absorber housing of claim 1, wherein said at least one second tube section has a constant outside diameter over an entire length of said at least one second tube section and is inserted into said first tube section according to said tubular wall overlap.

4. The shock absorber housing of claim 3, wherein said first tube section is expanded in an area of said tubular wall overlap compared to a remaining area of said first tube section.

5. The shock absorber housing of claim 1, wherein said first tube section is inserted into said second tube section according to said tubular wall overlap.

6. A shock absorber housing for a shock absorber of a vehicle, comprising:
   a tube having a longitudinal axis and having a tubular wall, and
   an attaching element joined onto said tubular wall, said attaching element determining a critical force introduction area of a force transmission from said attaching element into said tubular wall;
   said tube comprising:
   a first tube section having a first tubular wall and having a first end, and at least one second tube section having a second tubular wall and a second end, said first end of said first tube section and said second end of said at least one second tube section being joined together with a tubular wall overlap of said first tubular wall with said second tubular wall, said overlap extending in the direction of said longitudinal axis, said tubular wall overlap being situated in said critical force introduction area of said force transmission from said attaching element into said tubular wall;

wherein said attaching element is a mount for affixing said tube to a structure of a vehicle.

7. The shock absorber housing of claim 6 wherein said attaching element has a predetermined length in direction of said longitudinal axis of said tube, wherein said attaching element is joined entirely to said first tube section, and said first tube section has a length, which is approximately equal to a length of said attaching element.

8. A shock absorber housing for a shock absorber of a vehicle, comprising:

a tube having a longitudinal axis and having a tubular wall, and an attaching element joined onto said tubular wall, said attaching element determining a critical force introduction area of a force transmission from said attaching element into said tubular wall;

said tube comprising:

a first tube section having a first tubular wall and having a first end, and at least one second tube section having a second tubular wall and a second end, said first end of said first tube section and said second end of said at least one second tube section being joined together with a tubular wall overlap of said first tubular wall with said second tubular wall, said overlap extending in the direction of said longitudinal axis, said tubular wall overlap being situated in said critical force introduction area of said force transmission from said attaching element into said tubular wall;

wherein said first tube section is inserted into said second tube section according to said tubular wall overlap, and further wherein an end of said attaching element which faces said second tube section forms a substantially flush joint with said second end of said second tube section which faces said first tube section.

9. The shock absorber housing of claim 3, wherein an end of said attaching element which faces said second tube section overlaps said second end of said second tube section which faces said first tube section.

10. The shock absorber housing of claim 1, wherein said attaching element is a circumferential annular flange for supporting a plate.

11. The shock absorber housing of claim 10, wherein said attaching element is a circumferential annular flange for supporting a spring plate.

12. The shock absorber housing of claim 10, wherein said first end of said first tube section facing said at least one second tube section is bent over to form said annular flange.

13. The shock absorber housing of claim 1, wherein said tube further comprises at least one third tube section having a third tubular wall, said at least one second tube section being joined to said third tube section by a second tubular wall overlap between said second tubular wall and said third tubular wall.

14. The shock absorber housing of claim 13, wherein said at least one second tube section is inserted into said third tube section according to said second tubular wall overlap.

15. The shock absorber housing of claim 1, wherein said tubular wall overlap of said first tube section with said at least one second tube section is approximately 5 mm to approximately 25 mm in the direction of said longitudinal axis of said tube.

16. The shock absorber housing of claim 1, wherein said at least one second tube section is a longitudinal seam-welded tube section.

\* \* \* \* \*